Patented Apr. 27, 1954

2,676,941

UNITED STATES PATENT OFFICE 2,676,941

VINYL CHLORIDE POLYMERS PLASTICIZED WITH ALKYL CARBONATES OF GLYCOL LACTATES

Chessie E. Rehberg, Glenside, Pa., assignor to the United States of America as represented by the Secretary of Agriculture No Drawing. Original application November 10, 1950, Serial No. 195,137. Divided and this application June 17, 1952, Serial No. 294,112

3 Claims. (Cl. 260—31.4)

(Granted under Title 35, U. S. Code (1952), sec. 266)

The invention herein described may be manufactured and used by the Government of the United States of America for governmental purposes throughout the world without the payment to me of any royalty thereon.

This invention relates to the use of certain alkyl carbonate diesters of glycol dilactates as plasticizers. It is a division of Serial No. 195,137, filed November 10, 1950.

The carbonates of the invention may be represented by the formula

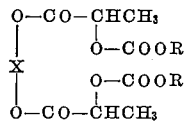

where —X— is an aliphatic, saturated, bivalent radical of a glycol having from 2 to 8 carbon atoms and which may contain either oxygens, and R is an alkyl group having from 1 to 12 carbon atoms.

These carbonates are high boiling esters useful as plasticizers for synthetic plastics. They are compatible with ethyl cellulose and when neither —X— nor R contain more than four carbon atoms, the esters are compatible with cellulose acetate. Where both —X— and R contain at least two carbon atoms, the carbonates are compatible with vinyl chloride polymers and copolymers.

The carbonates are conveniently prepared by the reaction of an alkyl chlorocarbonate (chloroformate) with a glycol dilactate, as indicated by the equation below. They can also be produced by treating the glycol dilactate with phosgene and reacting the resulting product with an alkanol.

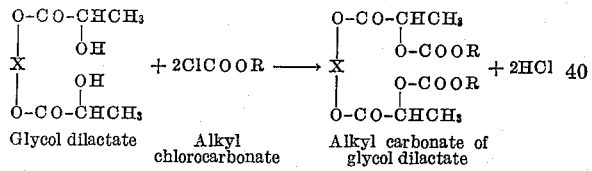

Glycol dilactate    Alkyl chlorocarbonate    Alkyl carbonate of glycol dilactate The glycol dilactates suitable for use in production of the carbonates in accordance with the above equation are, for example, those in which
—X— is —C₂H₄— (ethelene glycol dilactate),
—CH(CH₃)CH₂— (propylene glycol dilactate),
—CH(CH₂H₅)CH₂— (butylene glycol dilactate),
—CH(C₄H₉)CH₂— (hexylene glycol dilactate),
—(CH₂)₃— (trymethylene glycol dilactate),
—(CH₂)₄— (tetramethylene glycol dilactate),
—(CH₂)₅— (pentamethylene glycol dilactate),
—(CH₂)₂O(CH₂)₂ (diethylene glycol dilactate),
and —(CH₂)₂O(CH₂)₂O(CH₂)₂ (triethylene glycol dilactate).

Compounds wherein —X— is (CH₂)₂O(CH₂)₂— and R contains from 6 to 12 carbon atoms, are especially efficacious as plasticizers for vinyl chloride polymers and copolymers.

The following examples illustrate the invention:

EXAMPLE I

One mole of diethylene glycol dilactate (—X— being —(CH₂)₂O(CH₂)₂—) was dissolved in 300 cc. of dry ether, and 2.2 moles of pyridine was then added. The solution was stirred and kept at 0° to 10° C. while 2.2 moles of ethyl chlorocarbonate (R being CH₂CH₃) was slowly added. The mixture was then heated at 40° to 50° C. for 2 hours.

The reaction mixture was then washed successively with water, 2% aqueous hydrochloric acid, 2% aqueous sodium hydroxide and again with water. The ether and other volatile components were then removed by distillation, first at atmospheric pressure, and then under vacuum ending at a pot temperature of 150° C. and a pressure of 1 mm. The distillation residue thus obtained was an almost colorless material having a neutral reaction and consisted of substantially pure bis-(ethyl carbonate) of diethylene glycol dilactate having the formula

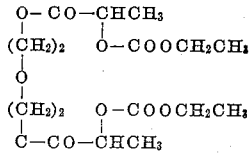

which on distillation yielded the analytically pure product having the following characteristics: Boiling point 135° C./0.01 mm. $n_D^{20}$ 1.4396. $d_4^{20}$ 1.1844.

EXAMPLE II

Bis-(hexyl carbonate) of diethylene glycol dilactate was obtained by the same procedure using hexyl chlorocarbonate (R being (CH₂)₅(CH₃)) in place of ethyl chlorocarbonate. The ester so obtained had the following characteristics: Boiling point 203° C./0.10 mm. $n_D^{20}$ 1.4454. $d_4^{20}$ 1.0847.

The ethyl and hexyl carbonates of diethylene glycol dilactate of Examples I and II were evaluated as plasticizers for polymerized vinyl chloride (35% plasticizer to 65% polymer), essentially as described by Kent et al., 1937 India Rubber World 115, 813–816. Some of the results so obtained are shown in the following table which also includes, for purpose of comparison, data obtained using as a control the same proportions of di-2-ethylhexyl phthalate, a standard and widely used commercial plasticizing agent.

*Properties of plasticized material*

| Plasticizer used | Tensile strength, lbs./sq.in. | Elongation, percent | Modulus at 100% elongation, lbs./sq.in. | Brittle point, Degrees C. |
|---|---|---|---|---|
| Control | 3,070 | 290 | 1,500 | −32 |
| Carbonate of Example I | 3,370 | 220 | 2,110 | −18 |
| Carbonate of Example II | 3,440 | 350 | 1,330 | −25 |

Similar results are obtained by analogous procedures using other higher alkyl carbonates of glycol dilactate such as the octyl, decyl and dodecyl carbonate.

I claim:
1. A plastic composition comprising polymerized vinyl chloride plasticized with a compound having the formula

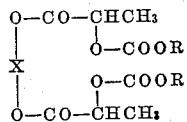

wherein —X— is an aliphatic, saturated, bivalent radical of a glycol having from 2 to 8 carbon atoms and which may contain ether oxygens, and R is an alkyl group having from 2 to 12 carbon atoms.

2. A composition as in claim 1 wherein the alkyl carbonate diester is an ethyl carbonate diester.

3. A composition as in claim 1 wherein the alkyl carbonate diester is an *n*-hexyl carbonate diester.

References Cited in the file of this patent

Ind. & Eng. Chem. article by Rehberg et al., vol. 42, No. 7, pages 1409–1411, July 1950.